United States Patent [19]

Chambers, Jr.

[11] 3,872,258

[45] Mar. 18, 1975

[54] VOLTAGE BOOSTER CIRCUIT FOR TELEPHONE SYSTEMS

[75] Inventor: Charles W. Chambers, Jr., Amherst, Ohio

[73] Assignee: Lorain Products Corporation, Lorain, Ohio

[22] Filed: Jan. 28, 1974

[21] Appl. No.: 437,491

[52] U.S. Cl. .............................................. 179/16 F

[51] Int. Cl. ......................... H04m 3/24, H04b 3/46

[58] Field of Search ......... 179/16 E, 16 F, 175.31 R

[56] References Cited

UNITED STATES PATENTS

| | | | |
|---|---|---|---|
| 3,757,052 | 9/1973 | Tothill | 179/16 F |
| 3,763,320 | 10/1973 | Chambers, Jr. | 179/16 F |
| 3,828,139 | 8/1974 | Chambers, Jr. | 179/16 F |

*Primary Examiner*—William C. Cooper
*Assistant Examiner*—Randall P. Myers
*Attorney, Agent, or Firm*—Edward C. Jason

[57] ABSTRACT

A voltage booster circuit for additively increasing the d-c operating current and voltage of the subscriber lines of telephone systems. Current gating circuitry senses the current through each conductor of the subscriber line and controls the connections of d-c voltage detecting circuitry thereto in accordance with the magnitude and direction of that current flow. The d-c voltage detecting circuitry, in turn, controls the insertion and removal of d-c boost voltage sources into and from the subscriber line, in accordance with the magnitude and the polarity of the d-c voltage which the central office applies to the subscriber line. The circuit is adapted to allow accurate measurements to be made on the subscriber line without disconnecting the voltage booster circuit from the subscriber line.

29 Claims, 5 Drawing Figures

VOLTAGE BOOSTER CIRCUIT FOR TELEPHONE SYSTEMS

BACKGROUND OF THE INVENTION

The present invention relates to telephone system voltage booster circuitry and is directed more particularly to an improved voltage booster circuit having a test-through characteristic.

One problem in telephone systems is the maintenance of an adequate d-c current flow in each subscriber line. This subscriber line current is used for various supervisory and control purposes and must exceed a known minimum value if the subscriber line is to operate properly. The difficulty in establishing an adequate d-c current flow in each subscriber line is that each subscriber line has a d-c resistance which varies with the length of line connecting the subscriber to his central office. It has been found advantageous to energize the majority of subscriber lines from a central office battery of generally adequate terminal voltage and to provide a plurality of voltage booster circuits for energizing those relatively few subscriber lines having resistances too high to operate directly from the central office battery. These voltage booster circuits are arranged to add d-c boost voltages in series-aiding relationship between the central office battery and the respective high-resistance subscriber lines and thereby raise the respective operating currents to an adequate value.

Because of the widespread use of reverse battery supervision, that is, the use of reversals in the polarity with which the central office battery is applied to the line for supervisory or control purposes, it is desirable for the voltage booster circuit to coordinate the polarity of the boost voltage with the polarity of the central office battery voltage to maintain a continuous series-aiding relationship therebetween. Thus, it is desirable for a voltage booster circuit to provide a reversable boost voltage which reflects reversals in the central office terminal voltage.

During ringing, however, it is not desirable for the polarity of the boost voltage to reverse in accordance with the instantaneous reversals in the polarity of the central office terminal voltage. This is because the latter reversals merely reflect a-c polarity reversals caused by the a-c component of the ringing voltage. Instead, it is desirable for the boost voltage to be maintained in series-aiding relationship with the d-c or trip component of the ringing voltage. This assures that the d-c line current will be sufficient to energize the ring-trip relay upon answer by the subscriber. Thus, it is desirable for a voltage booster circuit to coordinate the polarity of the boost voltage with the polarity of the d-c voltage across central office terminals not only during reverse battery supervision, but also during ringing.

During dialing, the line current is interrupted by the opening of dialing contacts in the subscriber set in order to de-energize a dialing relay in the central office. In order to assist the operation of the dialing relay, it is desirable for the boost voltage to be removed during the open period of each dial pulse and reinserted during the closed period of each dial pulse. This is because the presence of the boost voltage during the open period of a dial pulse increases the magnitudes of the transient and leakage currents which flow during dialing and therby detrimentally affects the operation of the dialing relay. Thus, it is desirable to control the insertion of a boost voltage not only in accordance with the polarity of central office terminal voltage, but also in accordance with the magnitude of the subscriber line current.

Another consideration in the design of a voltage booster circuit is the need for a test-through characteristic therein, that is, a characteristic whereby the subscriber line may be tested from the central office without manually disconnecting the voltage booster circuit from the line. The tests conducted from the central office normally consist of a high voltage-low current or open circuit test and a high current-low voltage or short circuit test. Since the results of both of these tests are strongly affected by the presence of a d-c boost voltage, it is desirable that the latter be withheld during line testing.

Prior to the present invention, there have been designed a variety of voltage booster circuits which provided some measure of the desired boost voltage reversal characteristics or the desired dial pulse correction characteristics or the desired ring-trip characteristics. None of these voltage booster circuits have, however, provided all of these characteristics together and none have provided these characteristics as effectively as the circuit of the invention. In addition, prior to the present invention, the desired test-through characteristic has been provided by separate test-through circuits which disconnected and bypassed the associated voltage booster circuits from the subscriber line upon the occurrence of a test condition. When such test-through and voltage booster circuits were used together, they provided one path for the transmission of normal operating current and a second, separate and distinct path for the transmission of test current. The present invention comprises improved circuitry which not only provides the desired reversing characteristic and the desired test-through characteristic, but also utilizes the same switching means to accomplish both functions and in addition provides improved dial pulsing and ring-trip characteristics.

SUMMARY OF THE INVENTION

It is an object of the invention to provide an improved voltage booster circuit having a test-through characteristic.

Another object of the invention is to provide a voltage booster circuit which improves dial pulsing by removing the boost voltage during dial pulse interruptions.

Still another object of the invention is to provide a voltage booster circuit of the above character which removes the boost voltage by introducing a voltage in cancelling relationship thereto during each dial pulse interruption.

A further object of the invention is to provide a voltage booster circuit which reverses the polarity of the boost voltage relatively rapidly after reversals in the d-c polarity of the line voltage and yet supplies a stable d-c boost voltage in spite of a-c reversals in the polarity of the line voltage during ringing.

It is still another object of the invention to provide a voltage booster having current gates for distinguishing normal d-c operating current from low magnitude test current in each conductor of the subscriber line.

A further object of the invention is to provide a voltage booster having voltage detectors adapted, on the one hand, to control the polarity of the d-c boost voltage in accordance with the polarity of the central office battery and adapted, on the other hand, to distinguish normal d-c operating voltage from low magnitude line test voltage on each conductor of the subscriber line.

It is a further object of the invention to provide a voltage booster circuit wherein the voltage detectors are connected to respective conductors of the subscriber line through respective current gates.

Another object of the invention is to provide a voltage booster circuit utilizing current gates and voltage detectors of the above character including a dial pulse correcting circuit for removing the boost voltage during each open period of dial pulsing and for restoring the boost voltage during each closed period of dial pulsing.

A further object of the invention is to provide a voltage booster circuit utilizing current gates and voltage detectors of the above character including a ringing disabler circuit for overriding the dial pulse correcting circuit and thereby assuring a stable d-c boost voltage during ringing.

Another object of the invention is to provide a voltage booster circuit including switching means having a first state in which a non-boosting path is provided between the central office and the subscriber line when neither subscriber line conductor is energized by normal d-c operating voltage or current, and having a second state in which a voltage boosting path is provided between the central office and the subscriber line when either subscriber line conductor is energized by normal d-c operating current and voltage.

DESCRIPTION OF THE INVENTION

Figure 1:
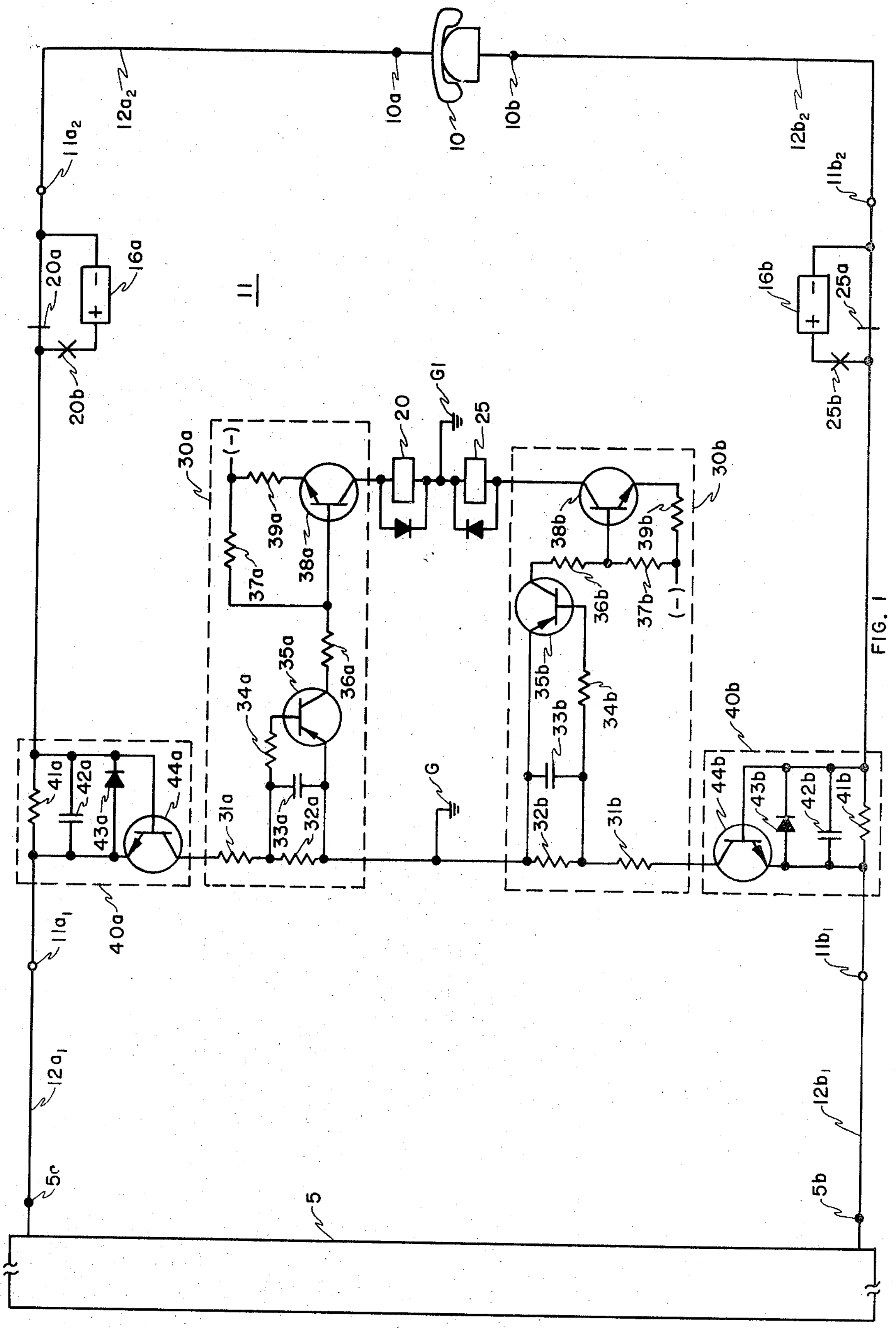
FIG. 1 is a schematic diagram of one embodiment of the circuit of the invention.

Referring to FIG. 1, there is shown a central office 5 for energizing a subscriber telephone set 10 through the conductors $12a_1$–$12a_2$ and $12b_1$–$12b_2$ of a subscriber line and through a voltage booster circuit 11. Included in office 5 is a central office battery which establishes the normal d-c operating voltages across and currents through the subscriber line. Voltage booster circuit 11 serves to increase the flow of d-c operating current between subscriber set 10 and central office 5 by inserting in series with subscriber line conductors $12a_1$–$12a_2$ or $12b_1$–$12b_2$ a d-c boost voltage which additively increases the d-c operating voltage of the subscriber line.

To the end that voltage booster circuit 11 may serially add a d-c boost voltage between terminals $11a_1$ and $11a_2$ thereof, or between terminals $11b_1$ and $11b_2$ thereof, voltage booster circuit 11 incluees switching includes which here takes the form of relays having coils 20 and 25 and contacts 20*a* and 20*b* and 25*a* and 25*b*. When relay 20 is in its first or de-energized state, contact 20*a* thereof is closed to provide a first or non-boosting current path between terminals $11a_1$ and $11a_2$. When relay 20 is in its second or energized state, contact 20*b* thereof is closed to provide a second or boosting current path between terminals $11a_1$ and $11a_2$ through a suitable d-c boost voltage source 16*a*. Thus, depending upon the operative state of relay 20, the subscriber line current flow is provided either a boosting or non-boosting path between terminals $11a_1$ and $11a_2$.

Similarly, when relay 25 is in its first or de-energized state, contact 25*a* thereof is closed to provide a first or non-boosting current path between terminals $11b_1$ and $11b_2$. When relay 25 is in its second or energized state, contact 25*b* thereof is closed to provide a second, boosting current path between terminals $11b_1$ and $11b_2$ through a suitable d-c boost voltage source 16*b*. Thus, depending upon the operative state of relay 25, the subscriber line current flow is provided either a boosting or non-boosting path between terminals $11b_1$ and $11b_2$.

Source 16*a* provides a d-c boost voltage which increases the magnitude of the subscriber line current when the latter flows towards central office 5 in conductor $12a_1$–$12a_2$. Boosting occurs because, under this condition, the central office equipment connects the negative terminal of the central office battery to terminal 5*a* and the positive terminal (ground) of that battery to terminal 5*b*, causing the voltage of source 16*a* to be in series-aiding relationship to the office battery around the subscriber loop joining office 5 to subscriber set 10. At the same time, the companion current flowing away from central office 5 in conductor $12b_1$–$12b_2$ is directed through contact 25*a* and thus receives no boost voltage. Thus, when contacts 20*b* and 25*a* are closed, the circuit of FIG. 1 is in a first boosting condition in which counter-clockwise loop current is aided.

Similarly, source 16*b* provides a d-c boost voltage which increases the magnitude of the subscriber line current when the latter flows towards central office 5 in conductor $12b_1$–$12b_2$. Boosting occurs because, under this condition, the central office equipment connects the negative terminal of the office battery to terminal 5*b* and the positive terminal (ground) thereof to terminal 5*a*, causing the voltage of source 16*b* to be in series-aiding relationship to the office battery around the subscriber loop joining office 5 to subscriber set 10. At the same time, the companion current flowing away from office 5 in conductor $12a_1$–$12a_2$ is directed through contact 20*a* and thus receives no boost voltage. Thus, when contacts 25*b* and 20*a* are closed, the circuit of FIG. 1 is in a second boosting condition in which clockwise loop current is aided.

In view of the foregoing, it will be seen that when the negative terminal of the office battery is applied to office terminal 5*a*, it is desirable for relay 20 to energize and thereby insert a boost voltage in the $12a_1$–$12a_2$ side of the subscriber line and that when the negative terminal of the office battery is applied to office terminal 5*b*, it is desirable for relay 25 to energize and thereby insert a boost voltage in the $12b_1$–$12b_2$ side of the subscriber line. This is because these conditions assure that a d-c boost voltage is provided for both of the polarities with which the central office battery may be connected to the subscriber line.

To the end that the operative state of relay 20 may be controlled in accordance with the magnitude of current flow toward the office 5 in conductor $12a_1$–$12a_2$, and in accordance with the magnitude of the voltage applied to the subscriber line by the central office, there is provided a first current gate 40*a* and a first voltage detector 30*a*. Current gate 40*a* serves to connect d-c voltage detector 30*a* to the subscriber line when the line current is approximately equal to the normal d-c operating current thereof and to disconnect detector 30*a* from the line when the line current is sufficiently less than the normal operating current to indicate the presence of high voltage-low current line test condition. Voltage detector 30*a*, in turn, senses the magnitude of the d-c operating voltage of the subscriber line and energizes relay 20 if the magnitude of the line voltage indicates the presence of the normal operating condition or de-energizes relay 20 if the magnitude of the line voltage indicates the presence of the low voltage-high current line test condition. Thus, a boost voltage can appear between terminals $11a_1$ and $11a_2$ only when neither the line current nor the line voltage indicate a test condition in conductor $12a_1$–$12a_2$.

Similarly, to the end that the operative state of relay 25 may be controlled in accordance with the magnitude of current flow toward the office 5 in conductor $12b_1$–$12b_2$, and in accordance with the magnitude of the voltage applied to the subscriber line by the central office, there is provided a second current gate 40*b* and a second voltage detector 30*b*. Current gate 40*b* serves to connect d-c voltage detector 30*b* to the subscriber line when the subscriber line current is approximately equal to the normal d-c operating current thereof and to disconnect detector 30*b* from the line when the line current is sufficiently less than the normal operating current to indicate the presence of the high voltage-low current line test condition. Voltage detector 30*b*, in turn, senses the magnitude of the d-c operating voltage of the subscriber line and energizes relay 25 if normal d-c operating voltage is present or de-energizes relay 25 if the magnitude of the line voltage indicates the presence of the low voltage-high current test condition. Thus, a boost voltage can appear between terminals $11b_1$ and $11b_2$ only when neither the line current nor the line voltage indicate a test condition in conductor $12b_1$–$12b_2$.

In the present embodiment, current gate 40*a* includes a switching transistor 44*a* having its collector-emitter power circuit connected between voltage detector 30*a* and booster circuit terminal $11a_1$ and having its base-emitter control circuit connected in series, line current sensing relationship between booster circuit terminals $11a_1$ and $11a_2$. Current gate 40*a* also includes a bypass diode 43*a* for conducting line current away from office 5 in conductor $12a_1$, an emitter-base threshold resistor 41*a* and a capacitor 42*a*. Similarly, current gate 40*b* includes a switching transistor 44*b* having its collector-emitter power circuit connected between voltage detector 30*b* and terminal $11b_1$ and its base-emitter control circuit connected between booster circuit terminals $11b_1$ and $11b_2$. Current gate 40*b* also includes a bypass diode 43*b*, a base-emitter threshold resistor 41*b* and a capacitor 42*b*.

In the present embodiment, voltage detector 30*a* includes a voltage divider comprising resistors 31*a* and 32*a* connected between ground G and current gate 40*a* to sense the magnitude of the d-c operating voltage applied to conductor $12a_1$. Detector 30*a* also includes switching transistors 35*a* and 38*a* for energizing and de-energizing coil 20 in accordance with the voltage established by voltage divider 31*a*–32*a*. Finally, detector 30*a* includes a time-delay capacitor 33*a* and biasing resistors 34*a*, 36*a*, 37*a* and 39*a*. Voltage detector 30*b* is similar to detector 30*a* and the components therein are given the same designations as the corresponding components in detector 30*a*, except for the substitution of the postscript "*b*" for the postscript "*a*".

The operation of current gate 40*a* and voltage detector 30*a* will now be described. When the central office causes current to flow from terminal $11a_2$ to terminal $11a_1$ through current gate 40*a*, as, for example, when negative office battery or a negative test supply is connected to office terminal 5*a*, a voltage is established across resistor 41*a*. If this voltage is relatively large as, for example, during normal d-c operating or talking current flow or during low voltage-high current test current flow, transistor 44*a* will turn on and will connect voltage detector 30*a* to line conductor $12a_1$. Under this condition, relay 20 will operate if the magnitude of the d-c line voltage, as sensed by detector 30*a*, indicates the presence of negative office battery and will not operate if the magnitude of the d-c line voltage indicates the presence of a low voltage-high current negative test supply. Thus, current gate 40*a* establishes one of the conditions necessary to the insertion of source 16a but cannot by itself insert that source.

If, however, the voltage across resistor 41*a* is relatively small as, for example, when a negative test supply is connected to terminal 5*a* to produce the high voltage-low current test current flow, transistor 44*a* will not turn on and will not connect voltage detector 30*a* to line conductor $12a_1$. Under this condition, relay 20 cannot be operated without regard to the magnitude of the line test voltage. Thus, current gate 40*a* can cause the removal of source 16*a* but cannot, by itself, cause the insertion of that source.

When the presence of negative office battery on office terminal 5*b* causes current to flow from terminal $11a_1$ to $11a_2$, the line current flows through current gate 40*a* through bypass diode 43*a* and resistor 41*a* to reverse bias transistor 44*a*. Under this condition, current gate 40*a* disconnects detector 30*a* from conductor $12a_1$ and thereby prevents the operation of relay 20 and the resultant insertion of source 16*a* in opposition to the line current. Thus, current gate 40*a* causes the removal of source 16*a* when the presence of the latter would reduce the net oerating voltage of the line.

Similarly, if a positive test supply is connected to office terminal 5*a* and causes test current to flow from terminal $11a_1$ to $11a_2$, transistor 44*a* will be reverse biased, causing current gate 40*a* to disconnect detector 30*a* from conductor $12a_1$. This prevents relay 20 from operating and thereby inserting source 16*a* in opposition to the test current. Under this condition, the base-collector junction of transistor 44*a* may become forward biased and thereby allow a current to flow from terminal $11a_1$ to ground G. In order to prevent the latter current from affecting the accuracy of test current measurements, a suitable diode may be connected in series with the collector of transistor 44*a*.

It will be understood that current gate 40*b* operates in a similar manner to connect voltage detector 30*b* to line conductor $12b_1$ when the current therein flows toward office 5 and has a value near the normal d-c operating current and to disconnect detector 30*b* when the current therein flows away from office 5 or has a value near the test current value for the line.

In view of the foregoing, it will be seen that resistors 41*a* and 41*b* within current gates 40*a* and 40*b* each impose, on their respective sides of the subscriber line, a current threshold which exceeds the magnitude of the highest test current therein and which is less than the lowest normal d-c operating current therein, and that these thresholds cause current gates 40*a* and 40*b* to distinguish between the normal d-c operating current condition and the low current line test condition. Thus, current gates 40*a* and 40*b* are basically two-state devices having first states during the low current test condition and second states during the normal operating or talking current condition.

As previously described, current gate 40*a* includes a capacitor 42*a* connected across resistor 41*a*. This capacitor provides a low impedance path for the transmission of a-c currents such as ringing and talking currents through the current gate 40*a*. Capacitor 42*b* serves a similar function in current gate 40*b*.

As previously described, voltage detector 30*a* controls relay 20 in accordance with the presence and absence of negative office battery voltage on central office terminals 5*a* and 5*b*. The manner in which this is accomplished will now be described. Assuming that current gate 40*a* is in its second or on state and that the negative terminal of the office battery is applied to office terminal 5*a*, a current will flow from ground G, through voltage divider 31*a*–32*a*, the collector-emitter path of transistor 44*a* and conductor 12*$a_1$* to the negative terminal of the office battery. The voltage across resistor 32*a* of voltage divider 32*a*–31*a*, in turn, turns on a first transistor 35*a* which establishes a current flow from ground G, through the emitter-collector circuit of transistor 35*a* and a second voltage divider including resistors 36*a* and 37*a* to a suitable supply of negative voltage (−) to turn on a second transistor 38*a*. Upon the turn on of transistor 38*a*, current flows from ground G1, through relay coil 20, the collector-emitter circuit of transistor 38*a* and a resistor 39*a* to the negative supply. The last-named current energizes relay 20 and thereby inserts boost source 16*a* into the subscriber line in aiding relationship to the negative office battery. On the other hand, when negative office battery is not connected to office terminal 5*a*, transistors 35*a* and 38*a* do not conduct and thereby prevent the insertion of booster source 16*a*. Thus, voltage detector 30*a* serves to detect the polarity of the central office terminal voltage and to control the insertion of a d-c boost voltage in conductor 12*$a_1$*–12*$a_2$* in accordance therewith.

Since the base-emitter circuit of transistor 35*a* is connected across resistor 32*a* of voltage divider 31*a*–32*a*, it will be seen that by properly selecting the resistances of these resistors, transistor 35*a* can be held in its nonconducting state so long as the negative voltage applied to office terminal 5*a* is less than a preset minimum. In the present embodiment, this minimum voltage is set at a value such that transistor 35*a* will turn on in the presence of normal d-c operating voltages on the line and yet remain off in the presence of the low magnitude voltage present during low voltage-high current line testing. In other words voltage detector 30*a* imposes a threshold voltage which is higher than the highest low magnitude test voltage and lower than the lowest magnitude operating voltage. Thus, voltage detector 30*a* not only serves a polarity detection function to control the insertion of a voltage boost during normal subscriber line operating conditions but also serves a line-test detection function to assure the removal that voltage boost during the low voltage-high current line test.

The operation of detector 30*b* is generally the same as that described in connection with detector 30*a*. Accordingly, given the presence of the second or on condition in current gate 40*b*, voltage detector 30*b* operates as a polarity detector to energize relay 25 and insert boost supply 16*b* when negative office battery is applied to office terminal 5*b*, and operates as a test condition detector to de-energize relay 25 and remove boost supply 16*b* when a d-c test voltage is applied thereto.

D-C voltage detector 30*a* includes a capacitor 33*a* connected across resistor 32*a* of voltage divider 31*a*–32*a*. In this position capacitor 33*a* slows down both the energization and de-energization of relay 20 by inhibiting sudden changes in the base-emitter voltage of transistor 35*a*. When, for example, negative office battery is applied to terminal 5*a*, capacitor 33*a* charges gradually until it attains a voltage sufficient to turn on transistor 35*a*. Similarly, when the negative office battery is removed from terminal 5*a*, capacitor 33*a* discharges gradually through the base-emitter circuit of transistor 35*a* to maintain conduction therethrough. Capacitor 33*b* serves a similar function in voltage detector 30*b*. This slowed down response is provided to impart the desired ring-trip characteristic as will now be described.

During ordinary interrupted ringing, ringing equipment consisting of an a-c ringing generator having a relatively high output voltage and a series-connected d-c trip battery having a voltage which is low in relation to the ringing voltage is connected between one side of the subscriber line and ground, the remaining side of the line being grounded. The ringing generator is then disconnected on a periodic basis to establish the quiet periods of the ringing interruption pattern. To accomplish ring-trip a d-c operated relay in the central office must be energized, upon pickup by the called subscriber, to disconnect this ringing equipment. If pickup should occur during the quiet period, ring-trip is ordinarily not a problem since there are present only a d-c voltage and current and since this voltage and current cause the insertion of the appropriate booster source in the manner previously described. In order to aid the occurrence of ring-trip when pickup occurs during the ringing period, however, the voltage booster circuit must continuously connect to the line the boost source having a polarity which aids the trip battery, in spite of the fact that the a-c component of the ringing voltage causes reversals in the polarity of the central office terminal voltage at the ringing frequency.

In the present embodiment, ring-trip is aided because, on the one hand, the voltage detector connected to the same side of the line as the ringing equipment has a response so slow, in relation to the ringing frequency, that the associated booster source is maintained in the line by the d-c trip voltage during a-c central office terminal polarity reversals and because, on the other hand, the voltage detector connected to the remaining side of the line has no a-c or d-c voltage applied thereto and therefore neither aids nor opposes ring-trip. Thus, the slow response time of voltage detectors 30*a* and 30*b* assures the provision of the desired continuous d-c boost voltage upon pickup, without regard to the side of the line to which the ringing equipment is connected and without regard to whether pickup occurs during the quiet or ringing periods.

Figure 2:
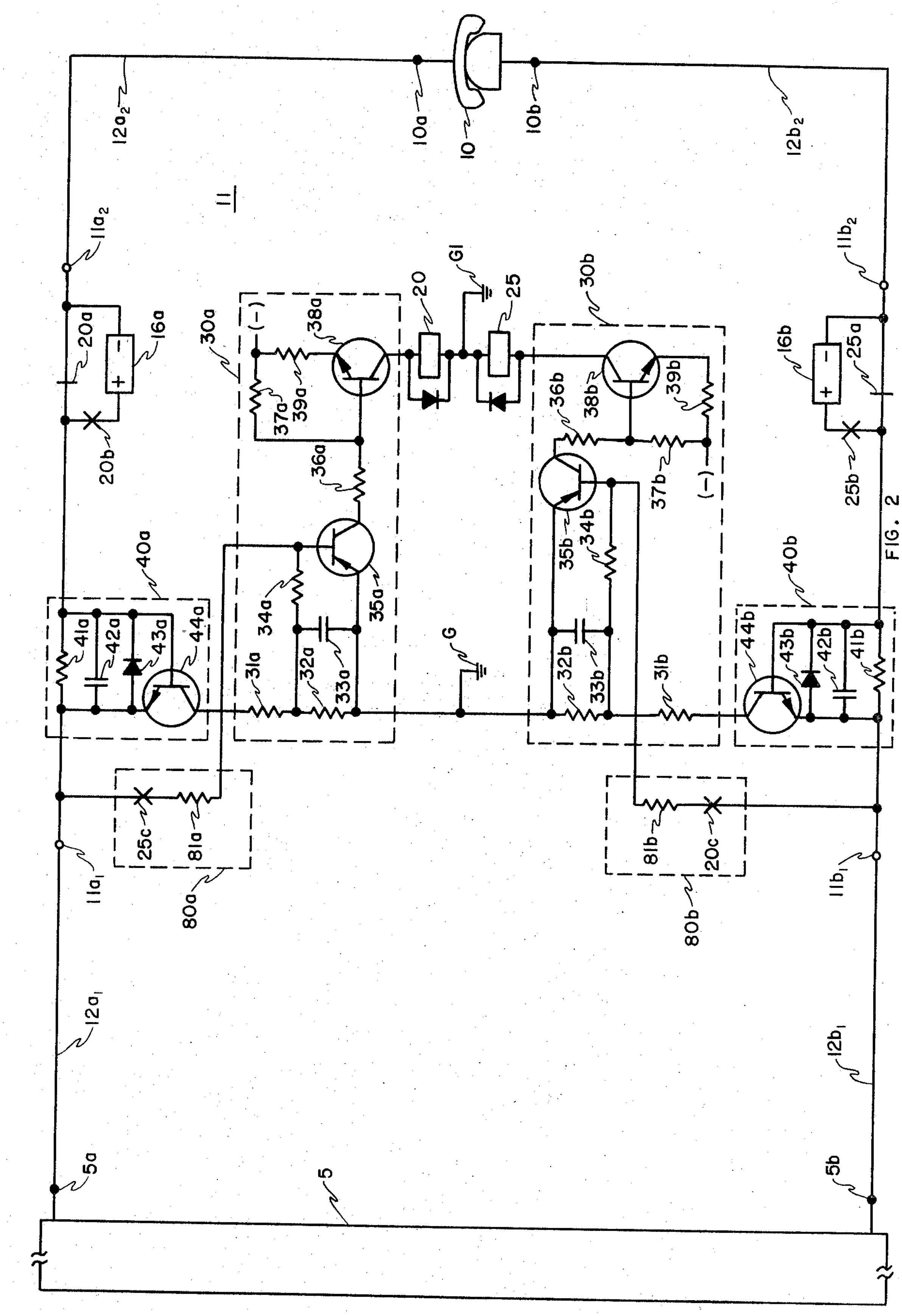
FIG. 2 shows a schematic diagram of a second embodiment of the circuit of the invention.

In most telephone systems it is desirable to detect and respond relatively quickly to a reversal in the d-c polarity of the central office terminal voltage. This is because a failure to respond quickly to such a reversal may cause the boost voltage to appear in series opposition to the central office terminal voltage. Due to the presence of capacitors 42*a* and 42*b* in current gates 40*a* and 40*b* and the presence of capacitors 33*a* and 33*b* in voltage detectors 30*a* and 30*b*, however, the insertion and removal of boost sources 16*a* and 16*b* occurs relatively slowly in the circuit of FIG. 1. To overcome this relatively slow reversal and yet maintain the above described ring-trip characteristic, there is provided in FIG. 2 an embodiment of the invention including all of the networks described in FIG. 1 and also including reversing networks 80*a* and 80*b*. Each of these reversing networks serves as a voltage override to circumvent the time-delays associated with the current gates and voltage detectors during d-c central office polarity reversals.

In the present embodiment, reversing network 80*a* includes a resistor 81*a* in series with a normally open contact 25*c* of relay 25 and reversing network 80*b* includes a resistor 81*b* in series with a normally open contact 20*c* of relay 20. Each of these networks is connected directly between one conductor of the subscriber line and the base of the transistor which controls the insertion of a boost voltage in that line conductor. Thus, reversing networks 80*a* and 80*b* bypass the time-delay circuitry in the current gates and voltage detectors.

Assuming that line current is flowing in the direction $\mathbf{11}a_2$–$\mathbf{11}a_1$, and that a steady state boost condition has been achieved, current gate 40*a* and detector 30*a* energize relay 20. Under these conditions, boost source 16*a* is in the line and relay contact 20*c* connects reversing network 80*b* to conductor $\mathbf{12}b_1$. If a polarity reversal occurs thereafter, that is, if a negative terminal of the central office battery is switched from office terminal 5*a* to terminal 5*b*, a current will flow from ground G through the emitter-base circuit of transistor 35*b*, resistor 81*b* and contact 20*c* to negative battery at terminal 5*b*. The latter current immediately turns on transistor 35*b* and inserts booster source 16*b* into the line. Since booster source 16*a* is already in the line and opposes the voltage of source 16*b*, the net boost voltage around the subscriber loop falls quickly to zero. Thereafter, capacitor 33*a* discharges through resistors 33*a* and 34 *a* and causes transistor 35*a* to approach a state of nonconduction. At the same time, capacitor 33*b* is charging by a current from ground G, through resistor 34*b* and resistor 81*b* to terminal 5*b* to cause transistor 35*b* to approach a state Finally, conduction. finally, during this same time, capacitor 42*b* is being charged by the subscriber line current to cause current detector 40*b* to approach an on condition. After this time elapses, capacitor 33*a* is discharged to the point where transistor 35*a* turns off and thereby de-energizes relay 20 and opens contacts 20*c* and 20*b* to disconnect reversing network 80*b* and booster source 16*a*. By this time, however, relay 25 can remain energized as a result of the charging of capacitors 33*b* and 42*b*. Under these conditions, only boost source 16*b* remains in the subscriber line to aid the reversed central office terminal voltage. Thus, reversing network 80*b* speeds up a reversal in the boost voltage by first casuing the net boost voltage to fall to zero and thereafter allowing the remaining circuitry to keep in the subscriber loop only that booster source which aids the reversed central office voltage.

Reversing network 80*a* operates in a manner similar to that described in connection with reversing network 80*b* to speed up reversals which occur as negative office battery is switched from office terminal 5*b* to 5*a*. In most telephone systems, it will, however, only be necessary to provide one or the other of reversing networks 80*a* and 80*b*. This is because, in most telephone systems, the speed of only one direction of polarity reversals is important. If, however, both reversing network 80*a* and reversing network 80*b* are present, booster circuit 11 will have the additional ability to transmit wink pulses, that is, pulses which consist of two polarity reversals occurring within a period of 100 milliseconds. In transmitting such wink pulses, booster circuit 11 neither aids nor opposes the voltages present during the wink pulse.

Figure 3:
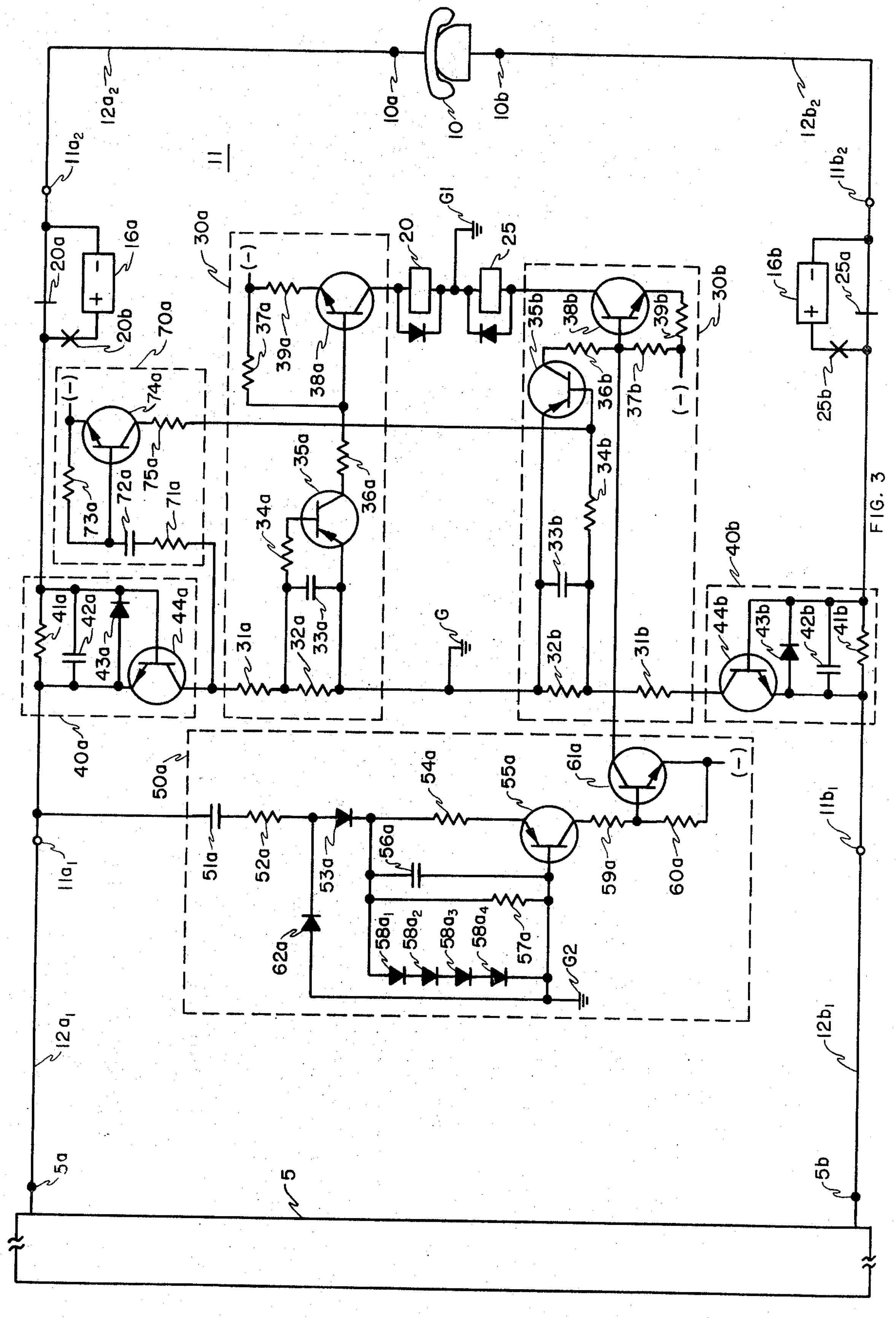
FIG. 3 is a schematic diagram of a third embodiment of the circuit of the invention.

During dial pulsing, it is desirable that a boost voltage be introduced into the line during the closed period of each dial pulse and that a boost voltage be removed from the line during the open period of each dial pulse. This is because the introduction of a boost voltage during the closed period of the dial pulse assures the rapid energization of the dialing relay and the removal of the boost voltage during the open period of the dial pulse assures the rapid de-energization of the dialing relay. In order to provide this dialing characteristic, the circuit of FIG. 1 may be modified, as shown in FIG. 3, by the addition of a dial pulse correcting circuit 70*a*. Dial pulse correcting circuit 70*a* senses the turn-off of current gate 40*a* during a dial pulse interruption and cancels the voltage produced by boost source 16*a*. This is accomplished by energizing relay 25 and thereby inserting boost source 16*b* into the subscriber line in cancelling relationship to source 16*a*. Before the subscriber current flow is resumed, correcting circuit 70*a* de-energizes relay 25 to disconnect boost source 16*b* from the line and thereby terminate boost voltage cancellation. Thus, pulse correcting circuit 70*a* withholds a boost voltage during the open period of each dial pulse and yet supplies a boost voltage during the closed period of each dial pulse.

Assuming that the central office dialing equipment causes line current to flow from terminal 10*a* to terminal 5*a* and that a steady-state boost condition has been achieved, current gate 40*a* and voltage detector 30*a* will have energized relay 20 to insert boost source 16*a*. Assuming further that the potential of the source of the negative voltage (−) is substantially equal to the potential which the dialing equipment applies to office terminal 5*a*, the conduction of current gate 40*a* causes capacitor 72*a* to be substantially uncharged. If, under these conditions, a dial pulse should occur, that is, if the current flow from terminal 10*a* to terminal 5*a* is interrupted, current gate 40*a* will turn off. Boost source 16*a* will, however, continue to appear in the subscriber line because capacitor 33*a* discharges to maintain conduction in transistor 35*a* during the open period of the dial pulse. Thus, the turn off of current gate 40*a* during a dial pulse does not immediately result in the removal of boost source 16*a*.

The turn-off of current gate 40*a* does, however, cause boost source 16*b* to be inserted into the subscriber line. This is because the turn-off of current gate 40*a* causes a control current to flow from ground G through resistor-capacitor network 32*a*–33*a*, resistor 31*a*, a resistor 71*a*, a capacitor 72*a* and a resistor 73*a* to negative source (−). Since capacitor 72*a* is initially uncharged, the latter current is large enough to establish across resistor 73*a* a voltage which turns on a transistor 74*a*. The conduction of transistor 74*a*, in turn, causes a second current to flow from ground G through resistor-capacitor network 32*b*–33*b*, resistor 34*b*, a resistor 75*a* and the collector-emitter circuit of transistor 74*a* to negative source (−). This second current flow establishes across resistor 34*b* and resistor-capacitor network 32*b*–33*b* a voltage sufficient to turn on transistor 35*b*. The turn-on of transistor 35*b*, in turn, energizes relay 25 to insert boost source 16*b* into the subscriber line and thereby cancel the voltage of boost source 16*a*. Thus, while boost source 16*a* is connected to the subscriber line during the entire dial pulse, boost source 16*b* is inserted into the subscriber line to cancel the boost voltage produced thereby.

As time passes, the current through capacitor 72*a* decreases and causes a corresponding decrease in voltage across resistor 73*a*. In the present embodiment, the values of capacitor 72*a* and resistors 71*a* and 73*a* are selected so that the voltage across resistor 73*a* falls below the level necessary to maintain conduction in transistors 74*a* and 35*b* only after the dialing relay has had time to de-energize. It will, therefore, be seen that pulse correcting circuit 70*a* inserts source 16*b* in cancelling relationship to source 16*a* only long enough to assist in the de-energization of the central office dialing relay. After that event, pulse correcting circuit 70*a* de-energizes relay 25 to remove source 16*b* and return voltage booster circuit 11 to a boosting condition in anticipation of the closed period of the dial pulse.

It will be understood that a pulse correcting circuit such as 70*a* may be connected to voltage detector 30*a* and current gate 40*b* to provide pulse correcting if the central office dialing equipment is of the type which connects the source of dialing voltage to office terminal 5*b* rather than office terminal 5*a*. Alternatively, pulse correcting circuits may be connected to each voltage detector and current gate. In the latter event, the desired pulse correcting activity will be provided for both of the previously described connections of the central office dialing equipment to the office terminals.

As previously described, it is desirable to supply a continuous d-c boost voltage during ringing. This continuous d-c boost voltage is desirable because it increases the d-c or trip component of the ringing voltage and current to aid the energization of the ring-trip relay upon pickup of the subscriber handset. In order to assure a continuous d-c boost during ringing, in the presence of pulse correcting circuit 70*a*, there is provided in the circuit of FIG. 3 a ringing disabler network 50*a*.

As previously described, during ringing, the a-c component of the ringing voltage produces an a-c current flow in the subscriber line. In the presence of this current flow, current gate 40*a* turns on and off but allows booster source 16*a* to be maintained continuously in series with the line. This occurs because the time-delay resulting from the presence of capacitor 33*a* allows transistor 35*a* to remain conducting during the times when current gate 40*a* is off. Due to the presence of pulse correcting circuit 70*a*, however, voltage detector 30*b* tends to energize and de-energize relay 25 and thereby periodically cancels the boost voltage of source 16*a* during ringing. In accordance with the present invention, ringing disabler 50*a* inhibits the energization of relay 25 during ringing to prevent this periodic cancellation of the boost voltage of source 16*a* and thereby assure a continuous d-c boost voltage during ringing.

Assuming that a positive-going a-c voltage is present on terminal 5*a*, current will flow from terminal 5*a* through a capacitor 51*a*, a resistor 52*a*, a diode 53*a*, and a resistor 57*a* to ground. This current flow will establish across resistor 57*a* a voltage sufficient to turn on a transistor 55*a*, the latter voltage being suitably limited to the forward conduction voltages of diodes $58a_1$, $58a_2$, $58a_3$ and $58a_4$. Upon the turn on of transistor 55*a*, current will flow from terminal 5*a* through diode 53*a*, a resistor 54*a*, the emitter-collector circuit of transistor 55*a* and a voltage-divider network including resistors 59*a* and 60*a* to the source of negative voltage (−). This current flow establishes across resistor 60*a* a voltage sufficient to turn on a transistor 61*a* and thereby apply to the base of transistor 38*b* a negative voltage sufficient to maintain the latter transistor in its non-conducting state. As a result, transistor 38*b* cannot energize relay 25 and, therefore, cannot insert source 16*b* in cancelling relationship to source 16*a*. Thus, during the positive-going excursion of the ringing voltage, ringing disabler 50*a* prevents the insertion of boost source 16*b* and thereby assures the maintenance of a d-c boost voltage in aiding relationship to the d-c or trip component of the ringing voltage.

During the negative-going portions of each ringing voltage cycle, current will flow from ground G2, through diode 62*a*, resistor 52*a* and capacitor 51*a* into office terminal 5*a*. This current will uncharge capacitor 51*a* sufficiently to allow current to flow downwardly through diode 53*a* upon the occurrence of the next occurring positive-going half-cycle of the ringing voltage. Thus, ringing disabler 50*a* can operate in the manner described for each positive-going ringing voltage excursion.

Included in ringing disabler 50*a* is a capacitor 56*a*. This capacitor prevents sudden changes in the base-emitter voltage of transistor 55*a*. When, for example, a positive-going a-c voltage is applied to terminal 5*a*, capacitor 56*a* charges until it attains a voltage sufficient to turn on transistor 55*a*. Thereafter, when a negative-going a-c voltage is applied to terminal 5*a*, capacitor 56*a* discharges in a circuit path including the emitter-collector circuit of transistor 55*a* to maintain conduction through that transistor throughout the negative half-cycle of ringing, even though diode 53*a* is then non-conducting. This can occur because negative source (−) acts through ground to supply the reverse base-collector bias necessary to maintain conduction through transistor 55*a*. Thus, transistor 61 conducts during both half-cylces of ringing to continuously prevent the insertion of boost source 16*b* into the line and thereby assure the continuous d-c boost necessary to afford desirable ring-trip characteristics.

It will be understood that if a pulse correcting network is connected between current gate 40*b* and voltage detector 30*a* instead of between current gate 40*a* and voltage detector 30*b*, a ringing disabler network such as 50*a* may be connected between terminal $11b_1$ and voltage detector 30*a* to provide the above-described ring-trip characteristic when the ringing generator and trip battery are connected to terminal 5*b* rather than to terminal 5*a*. Alternatively, if pulse correcting networks are connected to both current gates and both voltage detectors, ringing disabler networks may be connected to each side of the line and to each voltage detector. In the latter event, the desired ring-trip characteristics will be provided for both of the previously described connections of the ringing equipment to the line.

Figure 4:
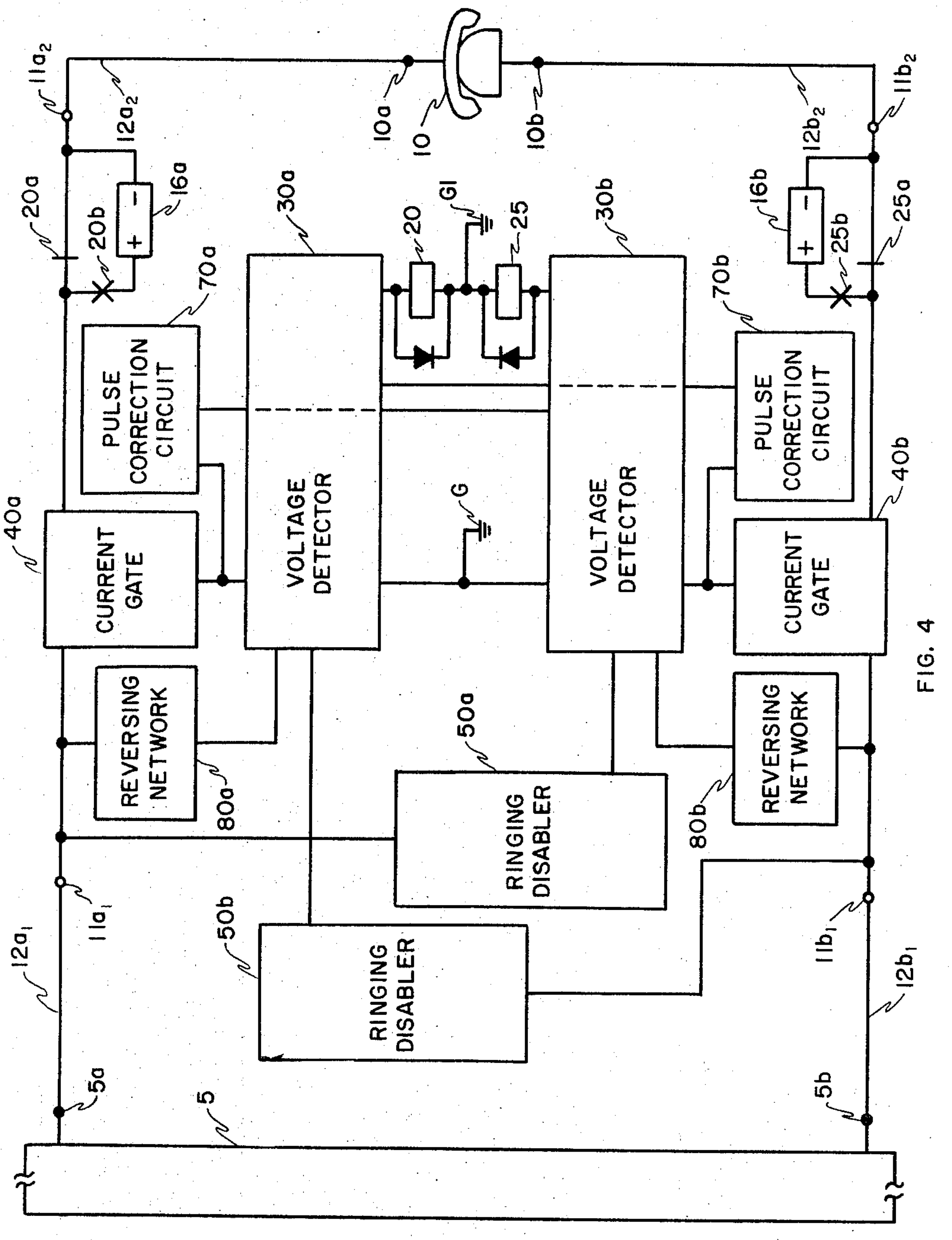
FIG. 4 shows a block diagram of a fourth embodiment of the circuit of the invention.

Several of the embodiments described previously may be combined into one voltage booster circuit having all of the previously described voltage boosting characteristics. One such voltage booster circuit is shown in FIG. 4. The circuit of FIG. 4 includes the current gates 40*a* and 40*b* and the voltage detectors described in connection with FIG. 1. The circuit of FIG. 4 also includes the reversing networks 80*a* and 80*b* described in connection with FIG. 2 as well as the pulse correcting circuits 70*a* and 70*b* and ringing disablers 50*a* and 50*b* described in connection with FIG. 3. Each of these networks provides the advantageous voltage boosting characteristics described previously with respect thereto in the presence of the reamining networks.

The circuit of FIG. 4, for example, supplies a boost voltage for either of the polarities with which the central office battery may be connected to the office terminals. Reversing networks 80*a* and 80*b* speed up d-c polarity reversals in either direction at the office terminals. Pulse correcting circuits 70*a* and 70*b* of FIG. 4 improve the dial pulsing characteristics of the voltage booster for both of the possible connections of the dialing equipment to the office terminals. Ringing disablers 50*a* and 50*b* enable the voltage booster to provide desirable ring-trip characteristics for both of the possible connections of the ringing equipment to the office terminals. The connections of the current gates and voltage detectors to each other, to the subscriber line and to relays 20 and 25 assure desirable test-through characteristics in the presence of all types of line testing. Thus, the circuit of FIG. 4 can be used in telephone systems having a wide variety of ringing, dialing, reversing and testing schemes.

Figure 5:
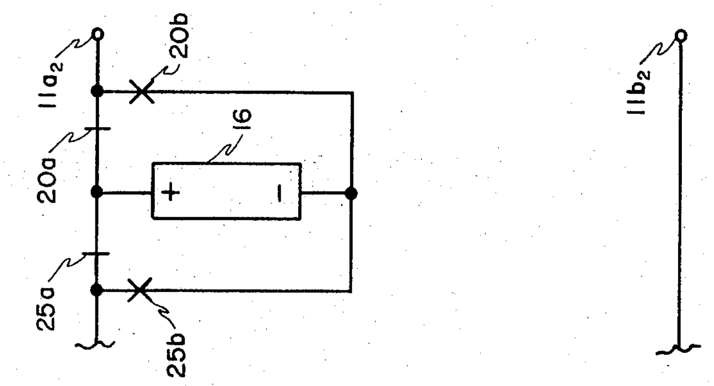
FIG. 5 is a fragmentary schematic diagram of an alternative switching arrangement which may be utilized in the circuits of FIGS. 1 through 4.

The circuit of FIG. 5 shows an alternative switching arrangement for controlling the connections of a boost voltage supply to the subscriber line. The use of this alternative switching arrangement allows a single boost supply 16 to be inserted into one side of the line with either polarity to increase the loop current flow in either direction. This arrangement also provides a test-through path between terminals 11*$a_1$* and 11*$a_2$* during line testing. It will be understood that the switching arrangement of FIG. 5 may be directly substituted for the corresponding switching arrangement of FIGS. 1 through 4 without significantly affecting the previously described operation thereof.

If, for example, negative office battery is applied to office terminal 5*a*, relay 20 will be energized and thereby close contact 20*b* and open contact 20*a* to establish a first boosting path between terminals 11*$a_1$* and 11*$a_2$*. Similarly, if negative office battery is applied to office terminal 5*b*, relay 25 will be energized and will thereby close contact 25*b* and open contact 25*a* to establish a second boosting path between terminals 11*$a_1$* and 11*$a_2$*. Finally, during line testing, relays 20 and 25 are de-energized to provide a test-through path between terminals 11*$a_1$* and 11*$a_2$* through contacts 20*a* and 25*a*.

In view of the foregoing, it will be seen that a voltage booster circuit constructed in accordance with the invention is adapted to provide the desired increase in d-c operating current and voltage in the presence of numerous telephone system operating conditions such as supervisory polarity reversal, dialing and ringing. In addition, it will be seen that the circuit of the invention is also adapted to accommodate line test and wink pulses and to actually improve the operating characteristics of the line in the presence of dialing and ring-trip.

It will also be understood that the embodiments described herein are for illustrative purposes only and may be changed or modified without departing from the spirit and scope of the appended claims.

What is claimed is:

1. A voltage booster circuit for telephone systems which comprises:

first and second office terminals for connection to a central office;

first and second subscriber terminals for connection to a subscriber line;

boost voltage supply means for increasing the magnitude of direct current flow in the subscriber line;

switching means for establishing a non-boosting path between the office terminals and the corresponding subscriber terminals, for establishing a first boosting path between one of the office terminals and the corresponding subscriber terminal through the boost voltage supply means to establish a first boosting condition, and for establishing a second boosting path between one of the office terminals and the corresponding subscriber terminal through the boost voltage supply means to establish a second boosting condition;

current gating means for detecting the presence and absence of normal d-c operating current in each conductor of the subscriber line;

voltage detecting means for causing the switching means to establish the first boosting path when the current gating means detects the flow of normal d-c operating current from the subscriber terminal to the corresponding office terminal in one conductor of the subscriber line and normal d-c operating voltage is detected on the same conductor, for causing the switching means to establish the second boosting path when the current from the subscriber terminal to the corresponding office terminal gating means detects normal d-c operating current in another conductor of the subscriber line and normal d-c operating voltage is detected on the same conductor, and for causing the switching means to establish the non-boosting path when the voltage on both conductors of the subscriber line is substantially less than the normal d-c operating voltage thereof or when the current gating means fails to detect normal d-c operating current in either conductor of the subscriber line; and means for connecting the voltage detecting means and the current gating means to each conductor of the subscriber line.

2. A voltage booster circuit as set forth in claim 1 wherein the voltage detecting means is connected to the conductors of the subscriber line through the current gating means.

3. A voltage booster circuit as set forth in claim 1 wherein the current gating means includes first and second current gates connected in series with respective conductors of the subscriber line and wherein each current gate establishes a current threshold which is below the normal d-c operating current of the respective conductor and which is above the test current applied to the respective conductor during the high voltage-low current testing of that conductor.

4. A voltage booster circuit as set forth in claim 3 wherein the first current gate is connected between the first office terminal and the first subscriber terminal to sense the direction of current flow therebetween and the second current gate is connected between the second office terminal and the second subscriber terminal to sense the direction of current flow therebetween.

5. A voltage booster circuit as set forth in claim 4 including current time-delay means for causing the current gates to respond relatively slowly to changes in the current flow in the conductors of the subscriber line.

6. A voltage booster circuit as set forth in claim 5 including reversing means for overriding the current time-delay means during d-c polarity reversals at the office terminals.

7. A voltage booster circuit as set forth in claim 1 wherein the voltage detecting means includes first and second voltage detectors connected between ground and respective office terminals and wherein each voltage detector establishes a voltage threshold which is below the normal d-c operating voltage at the respective office terminal and which is above the voltage at the respective office terminal during the low voltage-high current testing of the conductor associated with that office terminal.

8. A voltage booster circuit as set forth in claim 7 wherein the first voltage detector is connected between ground and the first office terminal to sense the polarity of the voltage at the first office terminal and the second voltage detector is connected between ground and the second office terminal to sense the polarity of the voltage at the second office terminal.

9. A voltage booster circuit as set forth in claim 8 including voltage time-delay means for causing the voltage detectors to respond relatively slowly to changes in the magnitude of voltage on the office terminals during ringing.

10. A voltage booster circuit as set forth in claim 9 including means for overriding the voltage time-delay means during d-c polarity reversals at the office terminals.

11. A voltage booster circuit as set forth in claim 1 including pulse correcting means for causing the switching means to establish a non-boosting condition during dial pulse interruptions and means for connecting the pulse correcting means to one office terminal and to the voltage detecting means.

12. A voltage booster circuit as set forth in claim 11 including ringing disabling means for causing the switching means to establish a boosting condition, during ringing, in spite of the presence of the pulse correcting means, and means for connecting the ringing disabling means to one of the office terminals and to the voltage detecting means.

13. A voltage booster circuit for telephone systems which comprises:

first and second office terminals for connection to a central office;

first and second subscriber terminals for connection to a subscriber line;

boost voltage supply means for increasing the magnitude of direct current flow in the subscriber line;

a first current gate connected between the first office terminal and the first subscriber terminal, the first current gate having a first state when the current flowing between the first subscriber terminal and the first office terminal is substantially less than the normal d-c operating current and having a second state when the current flow from the first subscriber terminal to the first office terminal is approximately equal to the normal d-c operating current;

a second current gate connected between the second office terminal and the second subscriber terminal, the second current gate having a first state when the current flowing between the second subscriber terminal and the second office terminal is substantially less than the normal d-c operating current and having a second state when the current flow from the second subscriber terminal to the second office terminal is approximately equal to the normal d-c operating current;

a first d-c voltage detector connected between ground and the first office terminal, the first voltage detector having a first state when the voltage appearing on the first office terminal is substantially less than the normal d-c operating voltage and having a second state when the voltage on the first office terminal is approximately equal to the normal d-c operating voltage;

a second d-c voltage detector connected between ground and the second office terminal, the second voltage detector having a first state when the voltage appearing on the second office terminal is substantially less than the normal d-c operating voltage and having a second state when the voltage appearing on the second office terminal is approximately equal to the normal d-c operating voltage;

switching means for establishing a first boosting path between one of the office terminals and the corresponding subscriber terminal, through the boost voltage supply means, when the first current gate and the first voltage detector are in their second states, for establishing a second boosting path between one of the office terminals and the corresponding subscriber terminal, through the boost voltage supply means, when the second current gate and the second voltage detector are in the second states, and for establishing a non-boosting path between the office and subscriber terminals when both voltage detectors are in their first states or when both current gates are in their first states.

14. A voltage booster circuit as set forth in claim 13 wherein the first voltage detector is connected to the first office terminal through the first current gate and wherein the second voltage detector is connected to the second office terminal through the second current gate.

15. A voltage booster circuit as set forth in claim 13 including pulse correcting means for causing the switching means to establish a non-boosting condition during dial pulse interruptions.

16. A voltage booster circuit as set forth in claim 15 including ringing disabling means for causing the switching means to establish one of the boosting paths, during ringing, in spite of the presence of the pulse correcting means.

17. A voltage booster circuit as set forth in claim 13 wherein:

the first voltage detector includes voltage time-delay means for causing the first voltage detector to respond relatively slowly to changes in the voltage on the first office terminal during ringing;

the second voltage detector includes voltage time-delay means for causing the second voltage detector to respond relatively slowly to changes in the voltage on the second office terminal;

the first current gate includes current time-delay means for causing the first current gate to respond relatively slowly to changes in the current between the first office terminal and the first subscriber terminal; and the second current gate includes current time-delay means for causing the second current gate to respond relatively slowly to changes in the current between the second office terminal and the second subscriber terminal.

18. A voltage booster circuit as set forth in claim 17 including reversing means for overriding the time-delay means of one of the voltage detectors and the associated current gate during d-c polarity reversals at the office terminals.

19. A voltage booster circuit for telephone systems which comprises:

first and second office terminals for connection to a central office;

first and second subscriber terminals for connection to a subscriber line;

boost voltage supply means for increasing the magnitude of d-c current flow in the subscriber line;

a first current gate having a first state when current flows between the first subscriber terminal and the first office terminal and has a value substantially less than the normal d-c operating current and having a second state when current flows from the first subscriber terminal to the first office terminal and has a value approximately equal to the normal d-c operating current;

means for connecting the first current gate between the first office terminal and the first subscriber terminal;

a second current gate having a first state when current flows between the second subscriber terminal and the second office terminal and has a value substantially less than the normal d-c operating current and having a second state when current flows from the second subscriber terminal to the second office terminal and has a value approximately equal to the normal d-c operating current;

means for connecting the second current gate between the second office terminal and the second subscriber terminal;

a first d-c voltage detector having a first state when the voltage appearing on the first office terminal is substantially less than the normal d-c operating voltage and having a second state when the voltage on the first office terminal is negative and has a value approximately equal to the normal d-c operating voltage;

means for connecting the first voltage detector between ground and the first office terminal;

a second d-c voltage detector having a first state when the voltage appearing on the second office terminal is substantially less than the normal d-c operating voltage and having a second state when the voltage appearing on the second office terminal is negative and has a value approximately equal to the normal d-c operating voltage;

means for connecting the second voltage detector between ground and the second office terminal;

first switching means for establishing a first boosting path between one of the office terminals and the corresponding subscriber terminal through the boost voltage supply means when the first current gate and the first voltage detector are in their second states and for establishing a non-boosting path between those terminals when the first voltage detector is in its first state or when the first current gate is in its first state; and second switching means for establishing a second boosting path between one of the office terminals and the corresponding subscriber terminal through the boost voltage supply means when the second current gate and the second voltage detector are in their second states and for establishing a non-boosting path between those terminals when the second voltage detector is in its first state or when the second current gate in in its first state.

20. A voltage booster circuit as set forth in claim 19 wherein the first voltage detector is connected to the first office terminal through a first current gate and wherein the second voltage detector is connected to the second office terminal through the second current gate.

21. A voltage booster circuit as set forth in claim 19 including pulse correcting means for causing the switching means to establish a non-boosting condition during dial pulse interruptions and means for connecting the pulse correcting means to the first offic terminal and to the second voltage detector.

22. A voltage booster circuit as set forth in claim 19 including ringing disabling means for causing the switching means to establish one of the boosting paths, during ringing, and means for connecting the ringing disabling means to the first office terminal and to the second voltage detector.

23. A voltage booster circuit for telephone systems which comprises:

first and second office terminals for connection to a central office;

first and second subscriber terminals for connection to a subscriber line;

a first and a second boost voltage supply;

a first current gate having a first state when current flows between the first subscriber terminal and the first office terminal and has a value substantially less than the normal d-c operating current and having a second state when current flows from the first subscriber terminal to the first office terminal and has a value approximately equal to the normal d-c operating current;

means for connecting the first current gate between the first office terminal and the first subscriber terminal;

a second current gate having a first state when current flows between the second subscriber terminal and the second office terminal and has a value substantially less than the normal d-c operating current and having a second state when current flows from the second subscriber terminal to the second office terminal and has a value approximately equal to the normal d-c operating current;

means for connecting the second current gate between the second office terminal and the second subscriber terminal;

a first d-c voltage detector having a first state when the voltage appearing on the first office terminal is substantially less than the normal d-c operating voltage and having a second state when the voltage on the first office terminal is negative and has a value approximately equal to the normal d-c operating voltage;

first switching means for inserting the first boost voltage supply between the first office and first subscriber terminals when the first current gate and the first voltage detector are in their second states and for metallically connecting the first office and first subscriber terminals when either the first current gate or first voltage detector is in its first state;

means for connecting the first switching means to the first voltage detector and to the first office and first subscriber terminals;

second switching means for inserting the second boost voltage supply between the second office and second subscriber terminals when the second current gate and the second voltage detector are in their second states and for metallically connecting the second office and second subscriber terminals when either the second current gate or the second voltage detector is in its first state;

means for connecting the second switching means to the second voltage detector and to the second office and second subscriber terminals.

24. A voltage booster circuit as set forth in claim 23 including pulse correcting means for causing the first and second switching means to insert the first and second boost supplies between the office and subscriber terminals, in cancelling relationship to one another, during dial pulse interruptions.

25. A voltage booster circuit as set forth in claim 24 including ringing disabling means for overriding the pulse correcting means during ringing to terminate the cancelling relationship and thereby assure the provision of a continuous d-c boost during ringing.

26. A voltage booster circuit as set forth in claim 25 including voltage time-delay means for causing the voltage detectors to respond relatively slowly to changes in the voltages at the respective office terminals.

27. A voltage booster circuit as set forth in claim 26 including a reversing network for overriding the time-delay means of at least one of the voltage detectors during d-c reversals at the office terminals.

28. A voltage booster circuit as set forth in claim 23 including voltage time-delay means for causing the voltage detectors to respond relatively slowly to changes in the voltages at the respective terminals.

29. A voltage booster circuit as set forth in claim 28 including a reversing network for overriding the time-delay means of at least one of the voltage detectors during d-c reversals at the office terminals.

* * * * *